United States Patent
Schick et al.

[19]

[11] Patent Number: 5,884,369
[45] Date of Patent: Mar. 23, 1999

[54] COUPLING PIN FOR BELT CONNECTOR

[75] Inventors: Jean-Francois Schick, Saint Christol lez Ales; Fabrice Longis, Vezenobre, both of France

[73] Assignee: Goro S.A., Saint Privat Des Vieux, France

[21] Appl. No.: 8,010

[22] Filed: Jan. 16, 1998

[30] Foreign Application Priority Data

Jan. 22, 1997 [DE] Germany .................. 197 02 005.4

[51] Int. Cl.⁶ ..................................................... F16G 3/04
[52] U.S. Cl. ........................ 24/33 P; 24/33 B; 24/33 M; 198/844.2; 474/257
[58] Field of Search ............................. 24/33 R, 33 P, 24/33 B, 33 M, 33 C; 198/844.2, 844.1; 474/253, 257

[56] References Cited

U.S. PATENT DOCUMENTS

| | | | |
|---|---|---|---|
| 4,024,605 | 5/1977 | Henke | 24/33 P |
| 4,641,398 | 2/1987 | Schick | 24/33 P X |
| 4,671,403 | 6/1987 | Schick | 24/33 P X |
| 5,038,442 | 8/1991 | Stolz et al. | 24/33 P |
| 5,514,438 | 5/1996 | Crook, Jr. | 24/33 P X |
| 5,701,638 | 12/1997 | Schick | 24/33 P |

FOREIGN PATENT DOCUMENTS 44 16 079  8/1995  Germany .

*Primary Examiner*—Anthony Knight
*Assistant Examiner*—Robert J. Sandy
*Attorney, Agent, or Firm*—Herbert Dubno; Andrew Wilford

[57] ABSTRACT

A pair of similar U-section clips each have a pair of legs secured to a respective belt end and a plurality of spaced knuckles that are interleaved to form a transversely extending passage. A coupling rod extending through the passage and interconnecting the clips has a relatively soft and bendable core pin and a helicoidal wrap of a wear-resistant hard material surrounding and directly engaging the pin and engaging the clip knuckles. The wrap can be made of an austenitic manganese steel and the pin can be a length of highly flexible steel cable.

4 Claims, 3 Drawing Sheets

COUPLING PIN FOR BELT CONNECTOR

FIELD OF THE INVENTION

The present invention relates to a coupling pin. More particularly this invention concerns such a pin used between a pair of belt-end connectors.

BACKGROUND OF THE INVENTION

A connector for a flat belt comprises at least one pair of U-section end clips interconnected by a transverse coupling pin or rod. Each such clip typically is made of metal and has a pair of legs adapted to embrace the respective belt end and a bight portion interconnecting the outer ends of the legs. Each leg in turn is formed with at least two throughgoing holes that align with the holes of the leg on the opposite face of the belt, and staples are driven through the registering holes from one side of the belt and are crimped over on the other side. The bight portion is formed as at least one loop or knuckle and the loops of the clip or clips of one belt end are interleaved with those of the other belt end and the coupling pin passes through the resultant passage to couple the two belt ends together.

As a result of tensile, bending and frictional forces acting on the curved bight portions and the coupling rod, the bight portions and the rod are subjected to extremely heavy wear. The wear results eventually in damage to the rod and bight portions and consequently to the entire conveyor-belt connector. A further result of this damage is expensive repair work and breaks in operation.

For this reason, coupling rods have been developed containing a bunched steel wire core and a helically wound steel jacket. Other embodiments do without the steel jacket and consist of twisted bunches of steel wire. Attempts have even been made to use bunches of glass and carbon fibers, but have not proven effective. The bight portions of belt-connector clips are regularly doubled, either by displacement of ductile material or by crimping over. This procedure, however, does not eliminate wear, and at best delays the damage resulting from wear.

Further a coupling pin for belt connectors for interconnecting the ends of conveyor belts is known from German 4,416,079 of W. Herold wherein core elements of a defined length are disposed inside at least one outer element. In this known coupling pin the outer element is in the form of a relatively soft material which distorts in use while the core elements each have a length sufficient to extend through more than two hinge loops of the connectors. The outer element serves only to produce the pin-like structure and for the introduction of the inner elements into the hinge loop zone of the connectors.

However, the outer element cannot withstand the stresses occurring because it is made of a relatively soft material which deforms in operation. Instead, the stresses are intended to be transmitted solely by the core elements. This cannot happen, however, simply because the considerable wear between the hinge knuckles and the coupling pin is bound to lead to early damage and finally destruction of the soft outer element. This leads to loosening of the inner core elements.

OBJECTS OF THE INVENTION

It is therefore an object of the present invention to provide an improved coupling pin for belt-end connectors.

Another object is the provision of such an improved coupling pin for belt-end connectors which overcomes the above-given disadvantage, that is which has a long service life.

SUMMARY OF THE INVENTION

A pair of similar U-section clips each have a pair of legs secured to a respective belt end and a plurality of spaced knuckles that are interleaved to form a transversely extending passage. A coupling rod extending through the passage and interconnecting the clips has according to the invention a relatively soft and bendable core pin and a helicoidal wrap of a wear-resistant hard material surrounding and directly engaging the pin and engaging the clip knuckles.

Thus it is possible for the coupling rod to deform to follow the shape of the belt as it passes around its rollers and drive wheels and as it sags under load. At the same time the part in direct contact with the knuckles, that is the wrap, is highly wear resistant, albeit at least limitedly elastically deformable, so that there is little wear between the outer surface of the coupling rod and the inner surface of the connecttor-clip knuckles. Such a rod can in fact be bent through as much as 180° without separation of the wrap and core pin, making it possible for the rod to follow even the most extreme deformations of the belt.

The wrap according to the invention is austenitic manganese steel, e.g. hard manganese steel X 120 Mn 12 having the following composition by weight:

| | |
|---|---|
| C | 1.10% to 1.30%, |
| Si | 0.30% to 0.50%, |
| MN | 12.00% to 13.00%, |
| P | <0.10%, and |
| S | <0.05%. |

According to another feature of the invention the wrap is tungsten steel with a predetermined relatively high carbon content. A high carbon content is necessary with tungsten steel since the available carbon is not all transformed by the tungsten into a carbide. Thus the basic mass of tungsten steel cannot be carbon free if it is to have the necessary hardness. The outer surface of the wrap is smooth.

The core pin in accordance with the invention is formed by a bunch of parallel wires, for instance as a short length of a steel-wire cable, plastic filaments, even of textile-fiber construction. It must be highly bendable and fairly strong.

BRIEF DESCRIPTION OF THE DRAWING

The above and other objects, features, and advantages will become more readily apparent from the following description, reference being made to the accompanying drawing in which.

SPECIFIC DESCRIPTION

Figure 3:
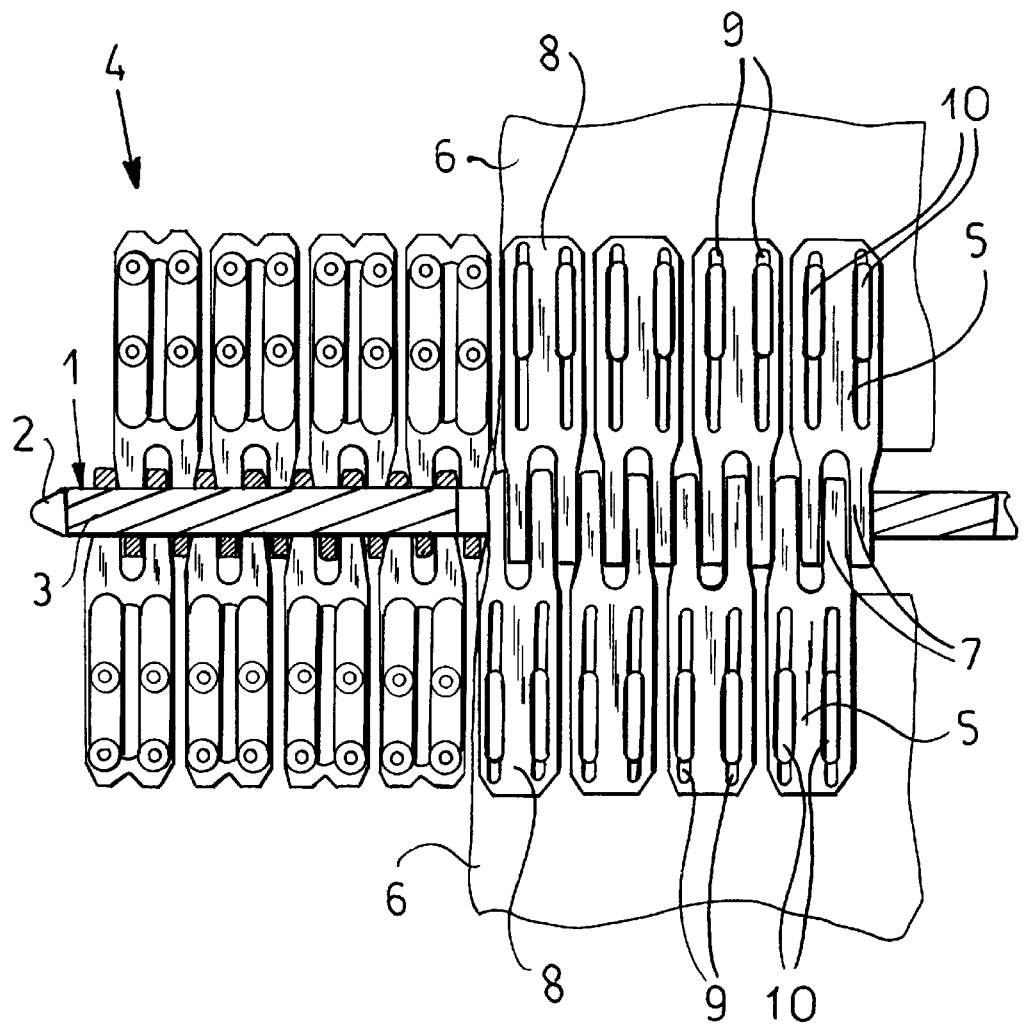
FIG. 3 is a small-scale view partly broken away showing the rod according to the invention connecting a pair of belt ends.

As seen in FIG. 3 a belt connector 4 comprises two sets of U-shaped clips 5 for coupling ends 6 of conveyor belts. Each clip 5 comprises at least one curved bight portion 7 and parallel legs 8 extending therefrom. A common coupling rod 1 is inserted through the pivotably interlocking curved bight portions 7 of two sets of clips 5. The legs 8 of the clips 5 have holes 9 for driving staples 10 through them. This corresponds generally to the system of above-cited commonly owned U.S. patent application Ser. No. 08/632,807 (now U.S. Pat. No. 5,701,638 issued 30 Dec. 1997).

Figure 1:
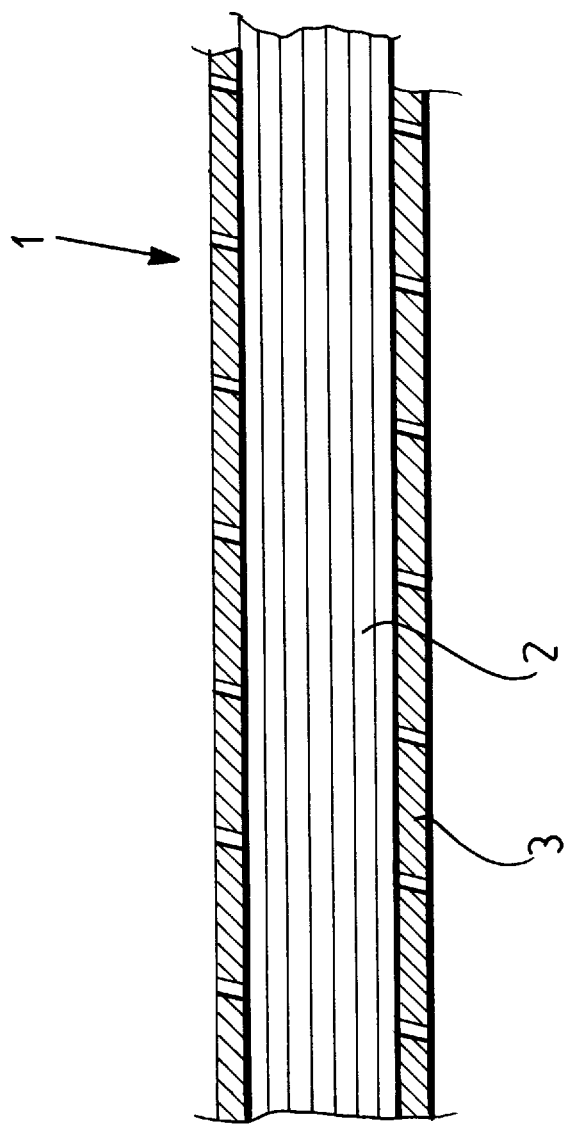
FIG. 1 is an axial section through the coupling rod according to the invention.
Figure 2:
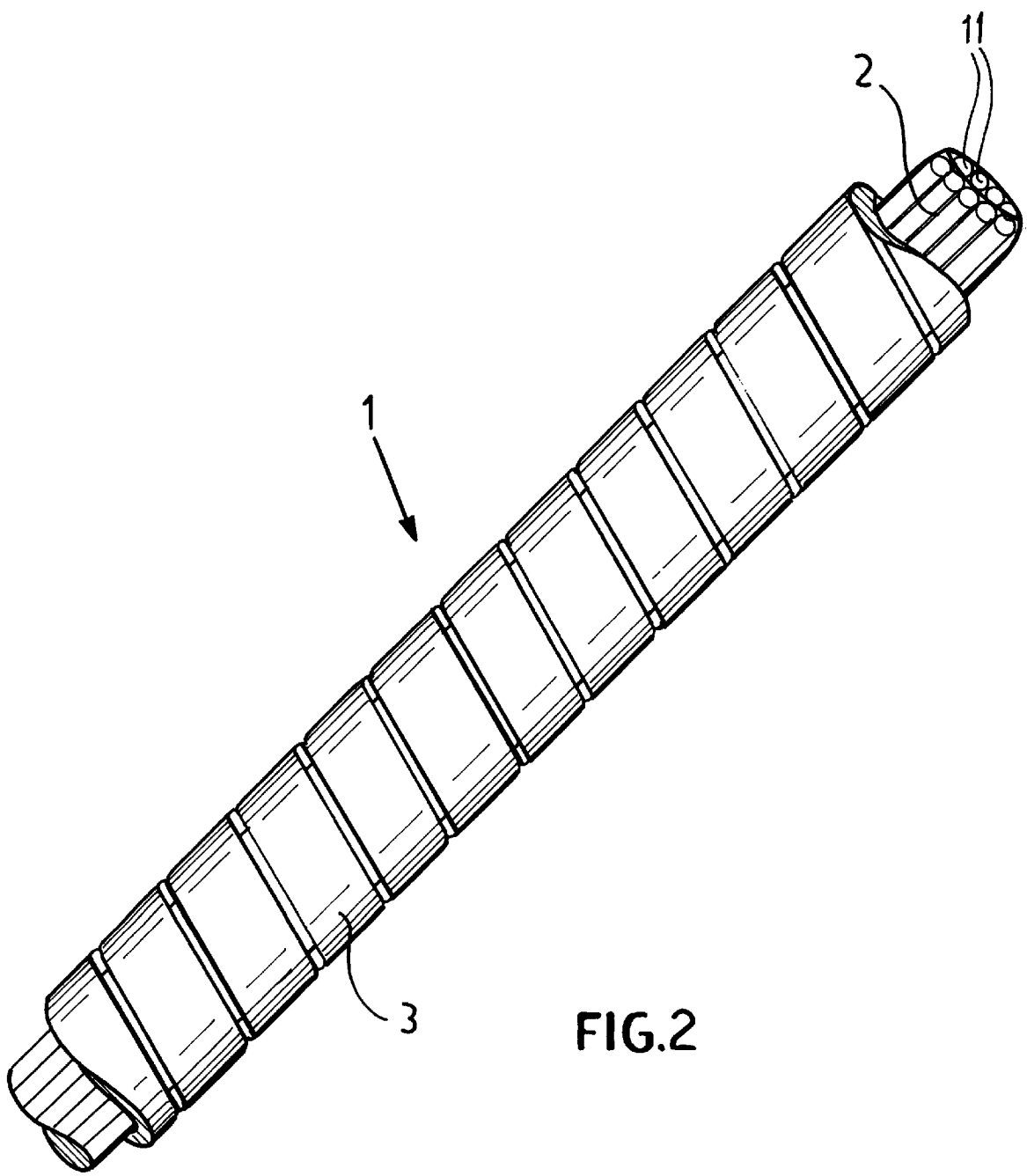
FIG. 2 is a side view of the rod.

In accordance with the invention as shown in FIGS. 1 and 2, the coupling rod 1 is formed by a core pin 2 and a helical wrap 3 surrounding the pin 2. Here the wrap 3 is made of an austenitic manganese steel and the pin 2 is a length of highly flexible steel cable formed of a bunch of wires 11.

We claim:

1. In combination with a pair of similar U-section clips each having a pair of legs secured to a respective belt end and a plurality of spaced knuckles, the knuckles being interleaved to form a transversely extending passage, a coupling rod extending through the passage, interconnecting the clips, and comprising:

a relatively soft and bendable core pin, and a helicoidal wrap of wear-resistant hard austenitic manganese steel directly engaging and surrounding the pin and having a smooth outer surface directly engaging the clip knuckles.

2. The belt-clip coupling rod defined in claim 1 wherein the core pin is formed by a bunch of parallel wires.

3. The belt-clip coupling rod defined in claim 1 wherein the austenitic manganese steel has the following composition by weight:

C 1.10% to 1.30%,

Si 0.30% to 0.50%,

MN 12.00% to 13.00%,

P <0.10%, and

S <0.05%.

4. In combination with a pair of similar U-section clips each having a pair of legs secured to a respective belt end and a plurality of spaced knuckles, the knuckles being interleaved to form a transversely extending passage, a coupling rod extending through the passage, interconnecting the clips, and comprising:

a relatively soft and bendable core pin, and a helicoidal wrap of wear-resistant high-carbon tungsten steel directly engaging and surrounding the pin and having a smooth outer surface directly engaging the clip knuckles.

* * * * *